United States Patent [19]

Ricketts et al.

[11] Patent Number: 5,249,821

[45] Date of Patent: Oct. 5, 1993

[54] TRAILER CAPABLE OF BEING DISMANTLED TO READILY STORABLE CONDITION

[75] Inventors: David T. Ricketts; David S. Webb, Clwyd, both of Wales

[73] Assignee: John Raymond Evans, United Kingdom

[21] Appl. No.: 824,301

[22] Filed: Jan. 23, 1992

[30] Foreign Application Priority Data

Jan. 26, 1991 [GB] United Kingdom ............... 9101740

[51] Int. Cl.⁵ .............................................. B62D 63/06
[52] U.S. Cl. .................................. 280/638; 280/656; 280/789
[58] Field of Search ................... 280/401, 30, 415.1, 280/491.2, 491.1, 656, 789, 638, 639, 63; 296/10, 27

[56] References Cited

U.S. PATENT DOCUMENTS

| | | | |
|---|---|---|---|
| 2,369,384 | 2/1945 | Zubatsky | 280/30 |
| 3,734,525 | 5/1973 | Rimbey | 280/30 |
| 4,196,918 | 4/1980 | Strader | 280/491.2 X |
| 4,239,258 | 12/1980 | Burris | 280/639 |
| 4,522,425 | 6/1985 | Cornwall et al. | 280/639 X |
| 4,705,280 | 11/1987 | Burns | 280/656 X |
| 4,746,142 | 5/1988 | Davis | 280/656 |
| 4,758,008 | 7/1988 | Moddejonge | 280/639 X |

FOREIGN PATENT DOCUMENTS 0008931 3/1980 European Pat. Off. ............ 280/656

*Primary Examiner*—Margaret A. Focarino
*Assistant Examiner*—Peter C. English
*Attorney, Agent, or Firm*—Anthony J. Casella; Gerald E. Hespos

[57] ABSTRACT

A trailer comprising an open top rectangular box member which is detachably attachable to a support assembly which is attachable to a motor vehicle so that the trailer can be towed. The support assembly comprises a support member mounted on two wheels, the open top box member being attached to the support member when the trailer is ready for use and detachable therefrom when the trailer is not in use. The support assembly is, when detached, locatable within the open top box member so that the support member at least substantially closes the open top of the box member to thus form a box-like structure which can be stored resting in any desired face.

7 Claims, 5 Drawing Sheets

TRAILER CAPABLE OF BEING DISMANTLED TO READILY STORABLE CONDITION

DESCRIPTION

The present invention relates to a trailer.

In particular the present invention relates to a trailer which in use is usually attached to the rear of a motor vehicle, the trailer basically comprising an open top box in which items can be placed for transport between locations. One known open box type trailer has a single two-wheel axle on which the open top box is spring mounted, an attachment arm extending from the front end of the box and being attachable to a motor vehicle by a conventional ball and hitch.

Whilst the trailers referred to hereabove are most useful, especially in a domestic situation where garden rubbish and other large items can easily be transported, storage of the trailer when not in use can be a problem. The trailer either takes up useful space in a garage, or is left somewhat as an eyesore, or as an open invitation to be stolen, obstructing a driveway or part of a garden.

The aim of the present invention is to provide a trailer which can be easily modified for convenient storage when not in use.

According to the present invention there is provided a trailer comprising an open top box member and a support assembly, the support assembly comprising a support member mounted on at least two wheels so as to be ready for use at all times, the open top box member being attachable to the support member when the trailer is ready to be used, the trailer then being attachable to a motor vehicle, and being detachable from the support member when the trailer is not in use, the detached support assembly being locatable within the open top box member.

In a preferred embodiment of the present invention the base member is rectangular and the support member is a rectangular member with a generally planar upper surface, the support member being mounted via springs on said wheels which are coaxially aligned with each other. An attachment arm is preferably connected to the support assembly so that, in use when the attachment arm extends out from the support assembly, the attachment arm is attachable to a motor vehicle so that the trailer can be towed. The attachment arm is preferably a tubular elongate member which is axially slidable in a guide or guides provided on the underside of the support member, and lockable both in an extended ready-for-use position wherein the arm projects beyond the edge of the support member at right angles to the rotational axis of said wheels, and in a retracted position, wherein the arm is located within the area of the support member. Alternatively the attachment arm may be hinged to the support assembly so that it can be hinged to a position under the support member when not in use, or the attachment arm may be detachable from the support assembly when not required.

Further, the box member preferably has a hinged or detachable side wall which, in the assembled ready-for-use trailer, is preferably the rear wall of the trailer. This rear wall is lockable in the closed position, though releasable to allow the rear wall to be hinged down to facilitate access and loading. Alternatively this rear wall may be completely detachable from the box member.

In the ready-for-use assembled condition the box member locates on the rectangular support member and preferably has a lip which depends from the side walls of the box member below the base of the base member, the side wall which is, in use, the front wall of the trailer, having a lip with an inwardly directed flange which engages over what is, in use, the front edge of the support member, to positively locate the box member on the support member. To hold the box member on the support member a locking mechanism, preferably comprising a pair of generally oppositely directed levers interconnected by a pivotal crank, is provided. The pivotal crank is spring biassed towards a locked position wherein the free end regions of the respective levers project beyond the side edges of the support member, and engage in holes in the depending lip of the box member, these holes being appropriately positioned to hold the depending lip of the box member against the front edge of the planar support member so that the box member is held in the support member both by the said levers and the inwardly directed flange of the said depending lip of the box member, which engages under the front edge of the support member. The pivotal crank is manually pivotable to move the levers against the spring bias towards each other to within the area of the support member, i.e. towards the released position.

When the trailer is not in use, the locking mechanism is released and the rear of the box member is lifted and the whole box member is moved forward to release the inwardly directed flange clear of the front edge of the support member. The box member can then be lifted off the support assembly and placed on the ground. Then, with the rear wall of the box member hinged flat on the ground or completely detached, and the attachment arm retracted, the support assembly can be wheeled into the box member, the height of the support assembly and the area of the support member being preferably such that the support member closes the open top of the box. With the support assembly partially within the box member the levers of the locking mechanism are moved to the released position and when the support member is located completely within the box member the locking mechanism levers are moved to a locked position, wherein the free end regions of the levers engage in appropriately positioned holes in the upper edge region of the box member, the spring bias holding the levers in this position. With the support member completely within the box member the front corner regions of the support member engage under webs across the corners of the box member, to thus aid the levers in holding the support assembly within the box member. By then closing the rear wall of the box member a readily storable rectangular box structure is achieved. Preferably, castors may be fitted on a wall of the box structure, preferably a smaller area side or end wall, so that the box structure may be upended and easily movable to a storage location, e.g. against a garage wall, where a minimum of floor space is taken up.

The present invention will now be further described, by way of example, with reference to the accompanying drawings, in which.

Figure 1:
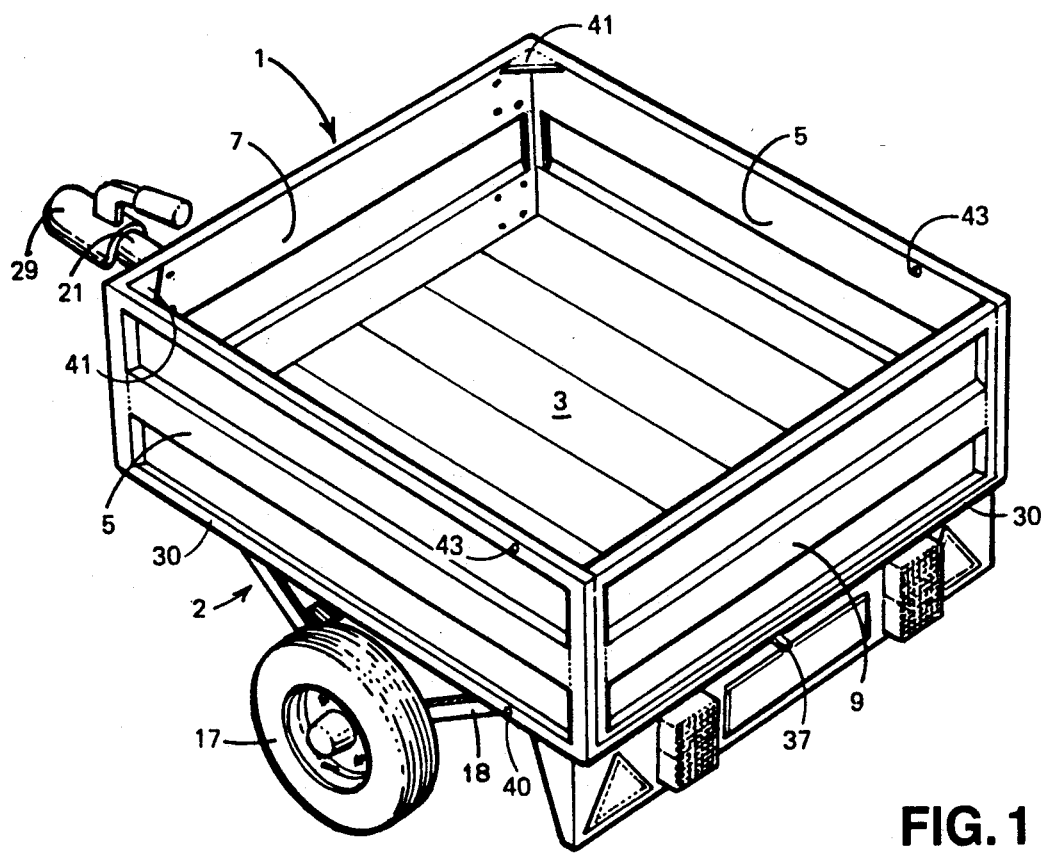
FIG. 1 is a perspective view of a preferred embodiment of the present invention.
Figure 2:
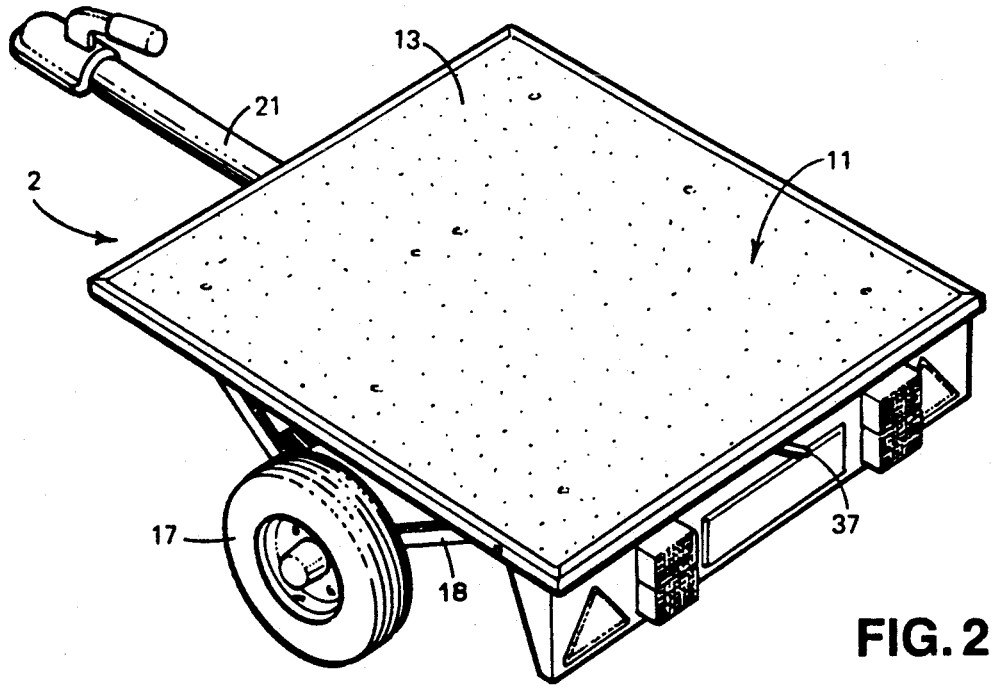
FIG. 2 is a perspective view of the embodiment of FIG. 1, with the box member removed.

A preferred embodiment of trailer constructed in accordance with the present invention is illustrated in the accompanying drawings, and comprises a rectangular open top box member 1 and a support assembly 2. The box member 1 comprises a base 3, two side walls 5, a front wall 7 and a rear wall 9, which maybe hinged along its bottom edge and which may include a lock (not shown) for securing the rear wall 9 in the closed position of FIG. 1. Alternatively, the rear wall can be completely detachable. The support assembly 2 (see FIGS. 2, 3 and 4) comprises a rectangular support member 11 which has a planar upper surface 13, an axle 15 which is secured to the underside of the support member 11 by brackets 18 and which carries two wheels 17 via springs 19.

Figure 3:
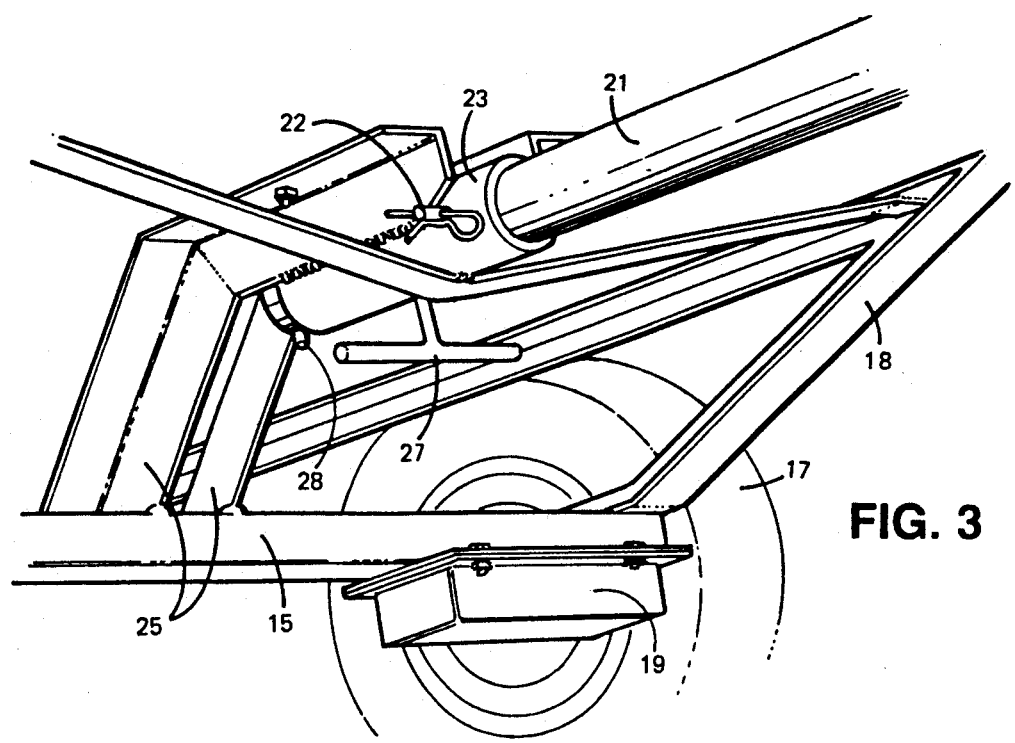
FIG. 3 is a perspective view of part of the underside of the embodiment of FIG. 1 with the attachment arm extended.
Figure 4:
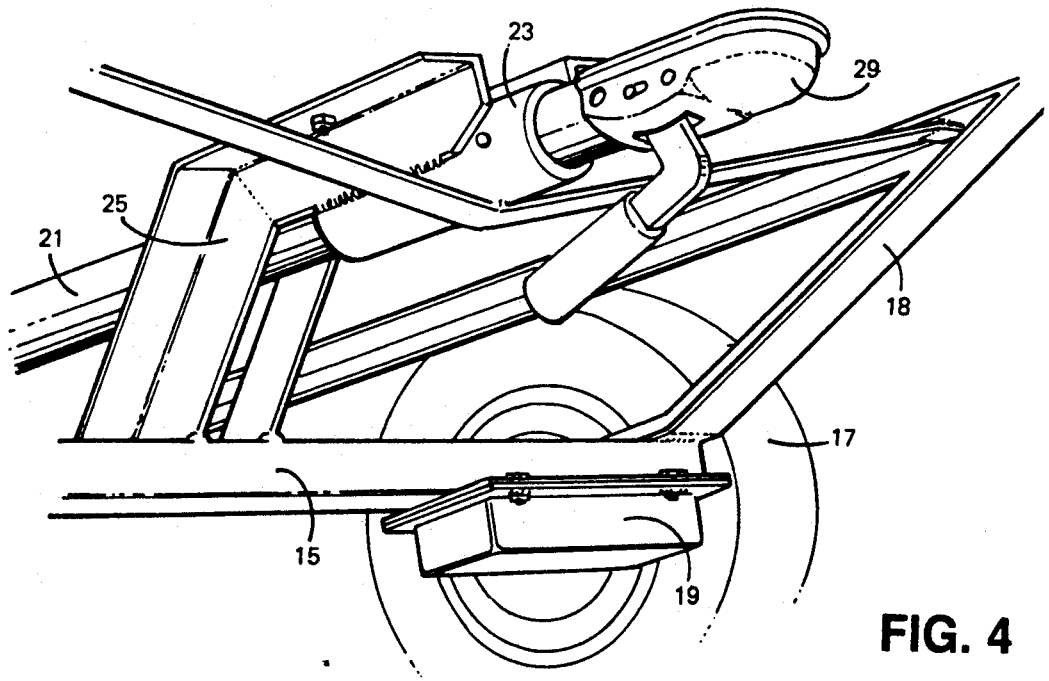
FIG. 4 is a perspective view, similar to FIG. 3, but with the attachment arm retracted.

As best seen in FIGS. 3 and 4, an elongate attachment arm 21 is axially slidably located in a hollow tubular guide 23 which is secured to the axle 15 via supports 25. The attachment arm 21 is lockable in the extended position of FIG. 3 by a pin 22 which extends through aligned apertures in the arm 21 and guide 23 and by tightening a T-piece 27 against the arm 21, which T-piece 27 is threadedly engaged in a complementary threaded aperture in the wall of the guide 23. A pin stop 28 or alternatively an enlarged end region of the attachment arm 21, prevents the accidental complete removal of the arm 21 from the guide 23. By slackening the T-piece 27 and removing the pin 22, the attachment arm 21 can be rotated and slid axially to the retracted position of FIG. 4, wherein the hitch 29 of a conventional ball and hitch, provided at the free end of the attachment arm 21, is located under the support member 11. In an alternative embodiment the attachment arm can be completely detachable from the support assembly or hinged thereto.

Figure 5:
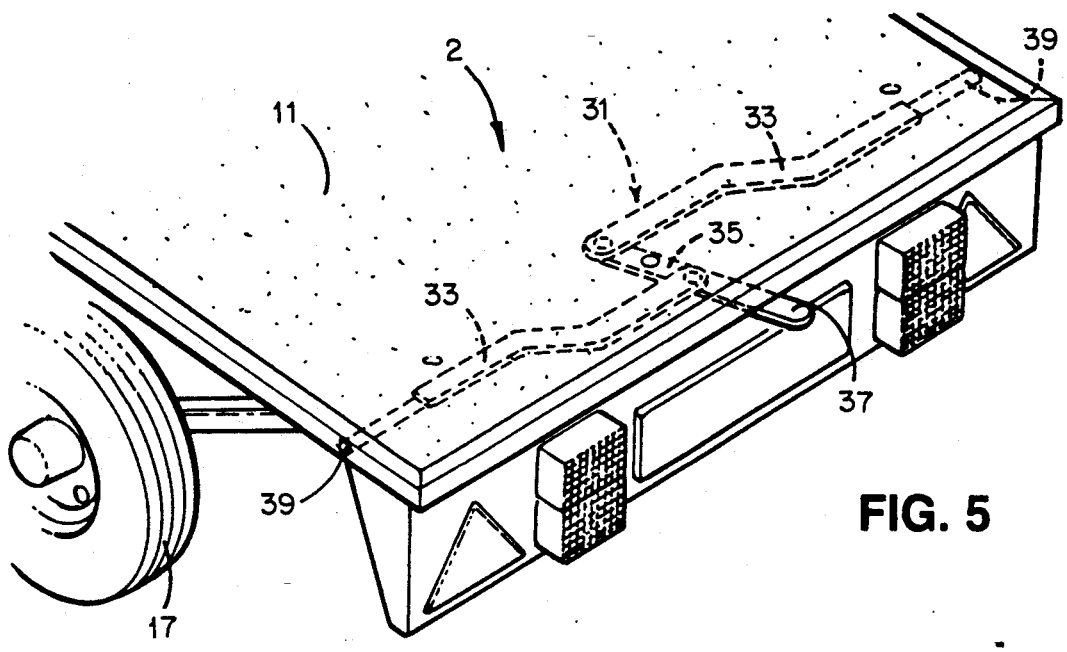
FIG. 5 is a perspective view of the rear of the support assembly of the embodiment of FIGS. 1 to 4, with the locking mechanism schematically illustrated.

To secure the box member 1 to the support member 11 of the support assembly 2, the base member 1 is first rested overhanging what is, in use, the front edge of the support member 11 and the box member 1 is then moved rearwardly relative to the support member 11 so that a depending lip 30 at the front of the box member 1 engages the front edge of the support member 11, said depending lip 30 extending all around the box member and depending below the undersurface of the box member. This depending lip 30 at the front of the box member 1 has an inwardly directed flange 32 which then engages under the front edge region of the support member to hold the front of the box member on the support member, the box member in this position resting flat on the support member 11 with the depending lip extending all around and to below the edge of the support member 11. To hold the box member 1 in this position a locking mechanism 31, best seen in FIG. 5, is provided on the underside of the support member. This locking mechanism 31 basically comprises two elongate levers 33 which extend in guides (not shown) on the underside of the support member 11, in generally opposite directions from opposite end regions of a crank member 35 which is pivotally secured to the underside of the support member 11. The crank member 35 is manually pivotable by lateral movement of an operating lever 37 which is accessible from the rear of the support assembly 2, against a spring (not shown), to the released position of FIG. 5, wherein the free end regions 39 of the levers 33 are withdrawn to a position within the side edges of the support member 11. With the operating lever 37 released, the spring (not shown) moves the crank member 35 so that the levers 33 each move generally axially so that their respective free end regions 39 project beyond the side edges of the support member 11. With the box member 1 located as described hereabove on the support member 11, and the operating lever 37 released, the free end regions 39 of the respective levers engage in appropriately positioned holes 40 provided in a depending side lip 30 on each side of the box member 1, to thus secure the box member 1 to the support assembly ready for use.

Figure 6:
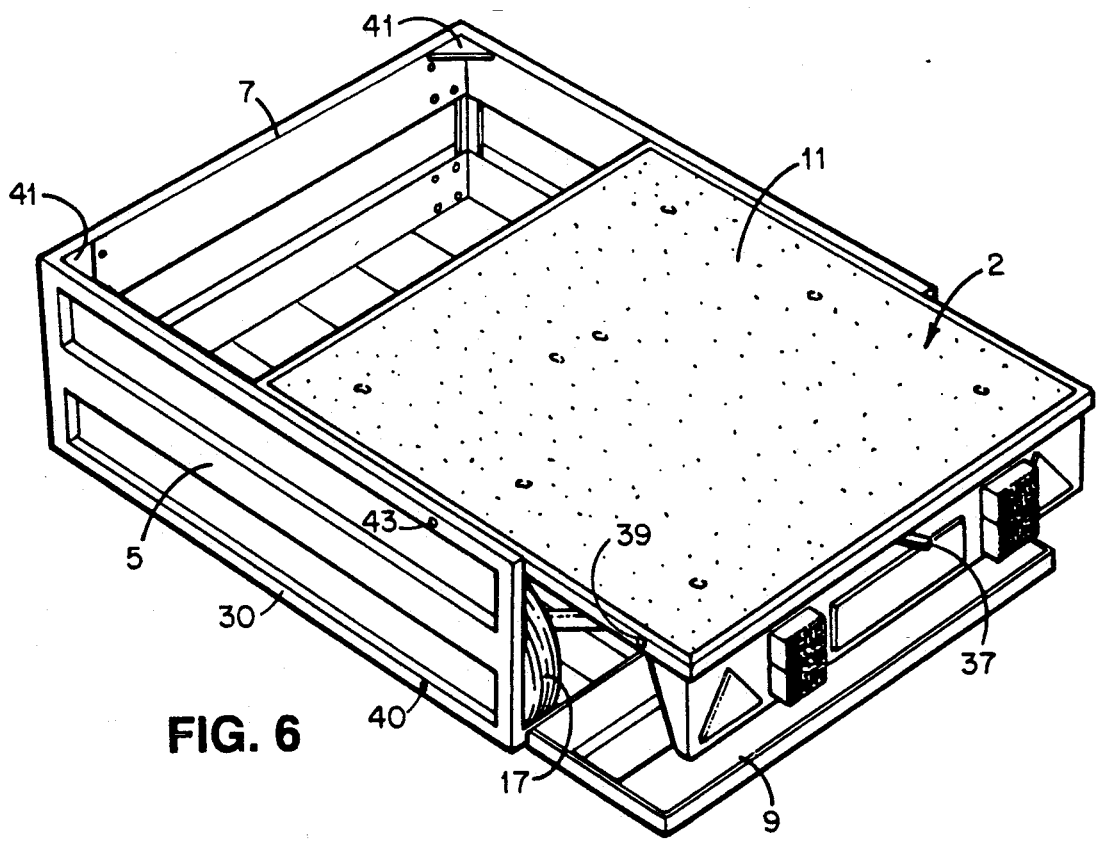
FIG. 6 is a perspective view of the box member with the support assembly partially inserted.
Figure 9:
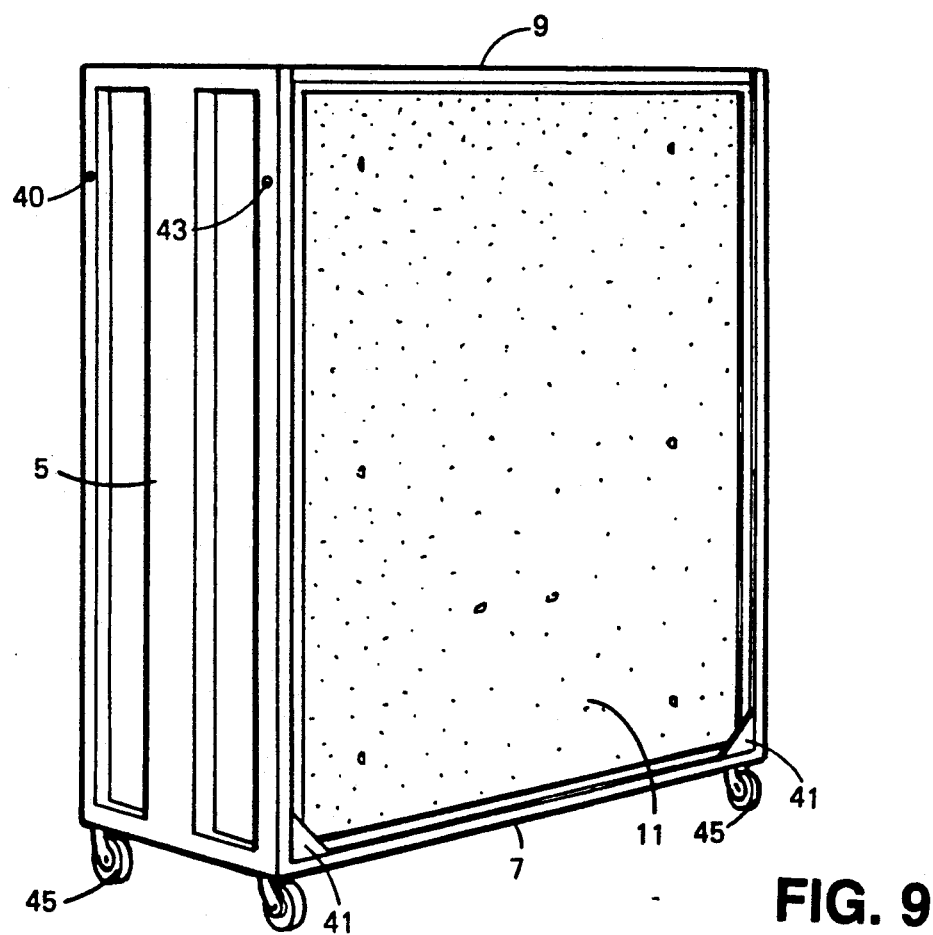
FIG. 9 is a perspective view of the preferred embodiment in an upended, stored condition.

When the trailer is not required and can be stored for future use, the box member 1 is released from the support assembly 2 by manual movement of the operating lever 37 which retracts levers 33 to the released position of FIG. 5 and by a subsequent lifting of the rear of the box member followed by forwards movement of the box member 1 relative to the support member 11, to move the flange 32 and lip 30 of the box member 1 clear of the front edges of the support member 11. Having then lifted the box member 1 off the support assembly 2 and laid it on the ground with the rear wall 9 hinged flat on the ground, the support assembly 2 with the attachment arm 23 retracted (FIG. 4) can be wheeled into the box member as shown in FIG. 6. By moving the operating lever 37 the levers 33 are retracted and the support assembly 2 can be moved to a position where the front corner regions of the support member 11 engage under webs 41 which extend across the upper part of the corner regions of the box member 1. As is seen from FIG. 6, the support member 11 is dimensioned and the support assembly 2 is of a design height, such that the support member 11 closes the open top of the box member 1. With the locking mechanism 31 released, the free end regions 37 of the levers 33 engage in appropriately positioned holes 43 provided in the upper edge region of the side walls 5 of the box member 1, to act with the webs 41 to hold the support assembly 2 within the box member 1. The rear wall 9 of the box member 1 can then be closed and locked, to thus form the readily storable box structure of FIGS. 7 and 9.

Figure 7:
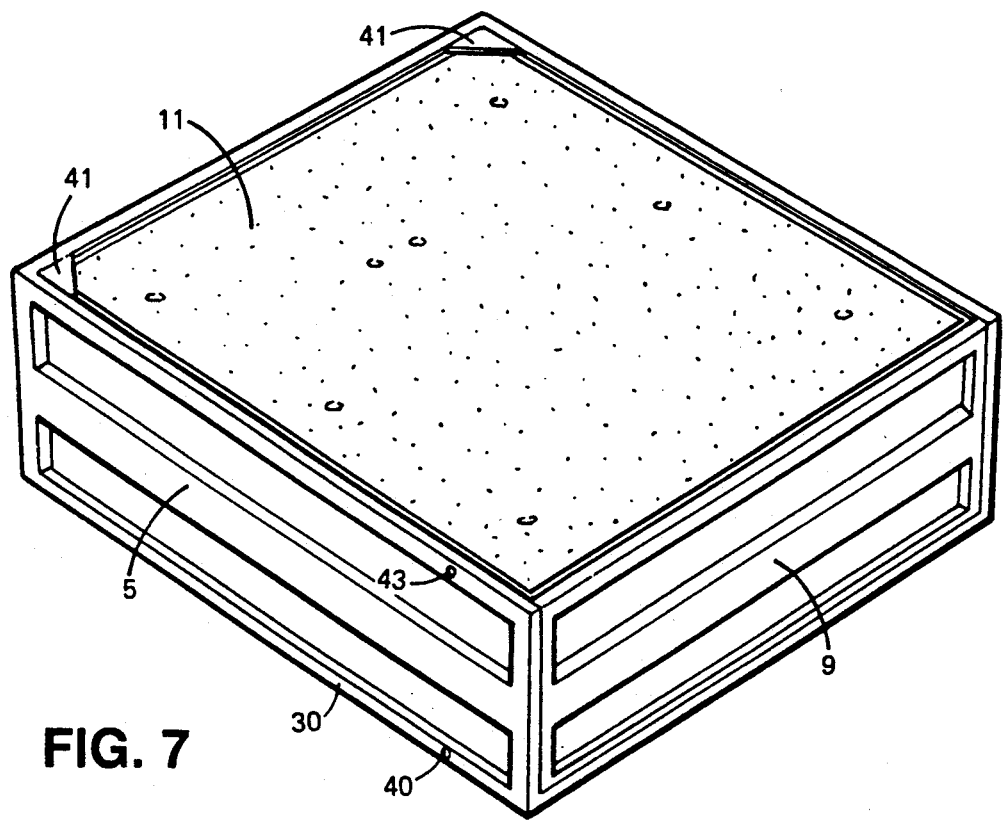
FIG. 7 is a perspective view of the box member with the support member fully inserted.
Figure 8:
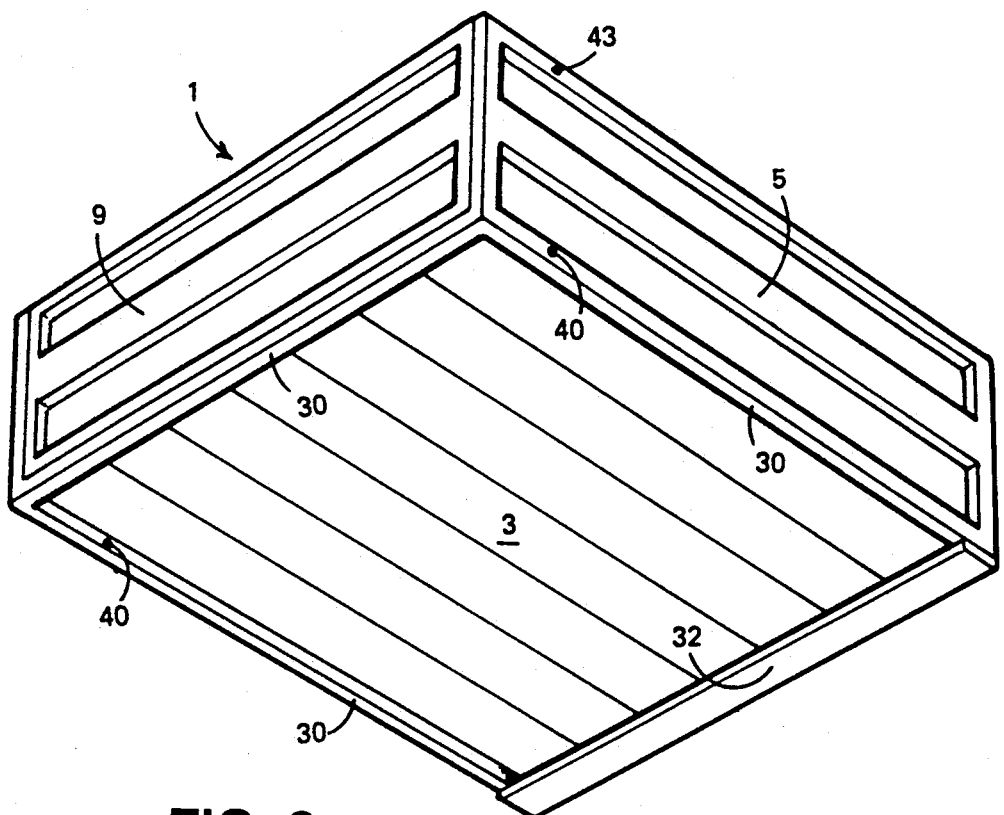
FIG. 8 is a perspective view of the underside of the box member.

By providing detachable castors 45 on a side wall 5 of the box member 1, the box structure of FIG. 7 can be upended so that it is readily movable on the castors through, for example, a doorway or house, and storable, for example against a wall, so as to take up a minimum of floor space.

The present invention thus provides a trailer which can be easily converted to a readily storable box structure.

We claim:

1. A trailer comprising an open top box member and a support assembly, the support assembly comprising a rectangular support member with an underside and a generally planar upper surface, at least two wheels being rotatably mounted on the underside of the rectangular support member, the open top box member being attachable to the support member to place the trailer in condition for use, the open top box member being detachable from the support member, and the detached support assembly being locatable within the open top box member, the support member having an area and support assembly, having a height, the area and the height being such that the support member at least substantially closes the open top of the box member when the support assembly is located in the box member, to thus form a box-like structure which can be stored resting on any desired face.

2. A trailer according to claim 1, wherein an attachment arm is securable in a fixed position on the support assembly, the attachment arm being then attachable to a motor vehicle by attachment means so that the trailer can be towed.

3. A trailer according to claim 2, wherein the attachment arm is an elongate member which is axially slidable in a guide provided on the support assembly, said elongate member being retractable to an out-of-use position wherein said elongate member is within the area of the support member, and extendible to a ready-for-use position in which it can be locked, wherein the elongate member projects beyond the area of the support member.

4. A trailer according to claim 1, the open top box member having a base and a plurality of upstanding side walls extending from said base wherein one said side wall of the open top box member is releasable from the other of said side walls to allow for easy access to the box member, the support assembly being then wheelable through the open side wall into and out of the box member.

5. A trailer according to claim 1, wherein corner regions of the rectangular support member engage under webs which extend across the inside of corresponding corner regions of the box member, to thus hold an end region of the support member within the box member.

6. A trailer according to claim 1, wherein the box member has a depending lip with an inwardly directed flange which engages over an edge of the support member to positively locate the box member on the support member in a ready-for-use position, a locking mechanism comprising a number of levers being located under the support member, said levers being spring biased to a position wherein free end regions of oppositely directed levers project beyond the edge of the support member and engage in appropriately positioned holes in depending regions of the box member to thus hold said depending lip and flange around said edge of the support member and positively secure the box member to the support member.

7. A trailer comprising an open top box member and a support assembly, the open top box member having a base and a plurality of upstanding side walls extending from said base, the support assembly comprising a support member mounted on at least two wheels, the open top box member being attachable to the support member when the trailer is ready to be used, the open top box member being detachable from the support member when the trailer is not in use, and the detached support assembly being dimensioned and configured to be located within the open top box member, and wherein a locking mechanism is provided on the support assembly, the locking mechanism comprising a number of levers which are spring biased toward a position wherein free and regions of the levers engage in holes disposed on portions of the side walls of the box member remote from the base thereof to hold the support assembly within the box member.

* * * * *